United States Patent [19]

Newton et al.

[11] Patent Number: 4,765,421

[45] Date of Patent: Aug. 23, 1988

[54] FOLDING SCALE

[76] Inventors: Robert F. Newton, 2459 Whitney Ave., Hamden, Conn. 06518; Frank D. Sundermeyer, 392 Matthew St., Prospect, Conn. 06712

[21] Appl. No.: 61,873

[22] Filed: Jun. 11, 1987

[51] Int. Cl.$^4$ .................. G01G 19/00; G01G 21/28; G01G 3/14

[52] U.S. Cl. ............................ 177/199; 177/127; 177/210 EM; 177/DIG. 5

[58] Field of Search ............ 177/126, 127, 210 EM, 177/208, 209, DIG. 5, 199, 211

[56] References Cited

U.S. PATENT DOCUMENTS

| | | |
|---|---|---|
| 1,436,360 | 11/1922 | Rowe . |
| 2,864,604 | 12/1958 | Cirlin . |
| 3,106,975 | 10/1963 | Madigan . |
| 3,169,022 | 2/1965 | Kretsinger . |
| 3,195,663 | 7/1965 | Thompson . |
| 3,433,316 | 3/1969 | Newman . |
| 3,680,650 | 8/1972 | Zimmerer . |
| 3,724,574 | 4/1973 | Hutchinson . |
| 3,743,040 | 7/1973 | Hutchinson . |
| 3,778,808 | 12/1973 | Stevens . |
| 3,966,002 | 6/1976 | Schneider . |
| 4,002,216 | 1/1977 | Solow . |
| 4,043,413 | 8/1977 | Schaenen . |
| 4,085,810 | 4/1978 | Wellman ......................... 177/209 |
| 4,173,263 | 11/1979 | Meeks . |
| 4,336,854 | 6/1982 | Jensen .................... 177/210 EM |
| 4,354,562 | 10/1982 | Newman .................. 177/210 EM |
| 4,382,480 | 5/1983 | Kmothe . |
| 4,503,922 | 3/1985 | Brosh . |

Primary Examiner—George H. Miller, Jr.
Attorney, Agent, or Firm—St.Onge Steward Johnston & Reens

[57] ABSTRACT

A scale is designed to be lightweight and easily portable. The scale comprises two weighing assemblies connected by a flexible joint so that the two assemblies may be folded against each other to form a compact case. Each weighing assembly comprises a weighing platform connected by resilient support members to a based. Weight measurement is effected by a Hall effect sensor in each weighing assembly which measures the variation in magnetic flux density caused by the movement of magnets mounted on the platforms when a load is placed on the platforms. Output from the Hall effect sensors is summed and the total weight is displayed on a digital display.

17 Claims, 3 Drawing Sheets

FOLDING SCALE

FIELD OF THE INVENTION

The present invention relates to a compact, folding scale or weighing device for determining a person's weight. More particularly, the present invention relates to a compact electronic scale wherein weight is measured by electrically operated sensing devices.

DESCRIPTION OF THE PRIOR ART

A typical scale for determining a persons weight has a relatively large platform sized to support two human feet. The scale, by definition, has a relatively large size, and heavy weight. It cannot be easily stored for traveling. In addition, scales are used by doctors in physical exams and it would be desirable to have a scale that would be compact and portable.

The closest known prior art is U.S. Pat. No. 4,354,562 to Martin H. Newman for an Electronic Weighing Device which comprises a weighing surface that is supported by polyurethane columns from a stationary surface so that the weighing surface may be displaced in response to the weight of an object placed on it. Sensing means in the form of Hall effect sensors attached to the weighing surface determine the degree of platform displacement by measuring the relative position change of a magnet attached to the stationary surface. The degree of platform displacement is correlated to the weight on the weighing surface and a display is provided.

Other art, such as U.S. Pat. No. 4,336,854 to William F. Jensen for a Weighing System also describe the use of Hall effect sensors in a weighing device. However, none of this art discloses a compact folding scale which is portable, easily stored, and suitable for travellers.

SUMMARY OF THE INVENTION

In accordance with the present invention, a compact folding scale is provided which is lightweight, portable, easily stored, and suitable for travellers and which will give a consistent and accurate measurement of weight. More particularly, the present invention provides a folding scale using Hall effect sensors to measure the weight on each of two weighing assemblies and provides circuitry to sum the weight on each weighing assembly and display the total weight.

In one embodiment of the invention, a folding scale includes a pair of weighing assemblies, which are flexibly joined to the other so that they may be folded to form a compact case. Each of the weighing assemblies comprises a rigid weighing platform supported from a base by a plurality of helical springs. Mounted on each weighing platform is a pair of magnets held in a spaced relationship from a Hall effect sensor which produces a voltage output in linear response to the change in magnetic flux density caused by the movement of the magnets when a person steps on the platforms and causes them to move towards the bases. Circuitry is provided to sum the outputs from the Hall effect sensors and to display the person's weight.

Other objects, aspects and features of the present invention in addition to those mentioned above will be pointed out in and will be understood from the following detailed description provided in conjunction with the drawings.

DETAILED DESCRIPTION OF THE PREFERRED EMBODIMENT

Figure 1:
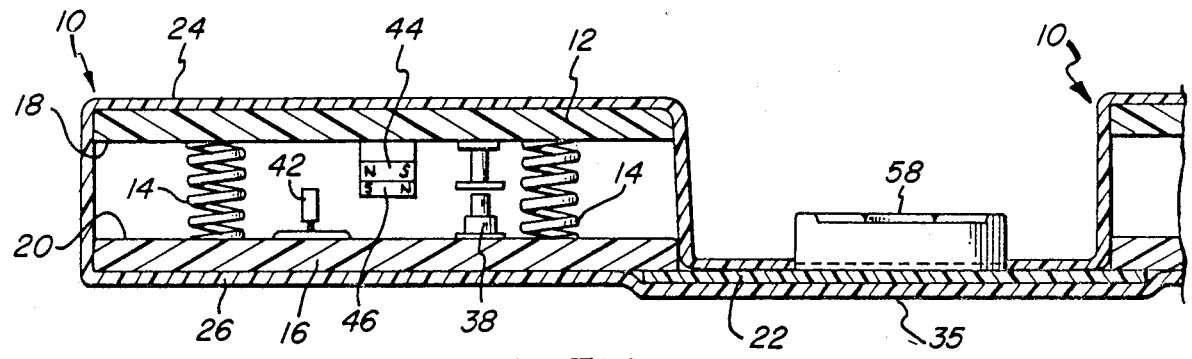
FIG. 1 is a cut-away view along line 1—1 of FIG. 2 of one of two weighing assemblies in accordance with the present invention.

Referring now to FIG. 1, one of two weighing assemblies 10 is shown as having a rigid weighing platform 12 for receiving and supporting on its upper surface the object to be weighed, connected by a plurality of resilient members, shown as helical springs 14, to a base 16. The plurality of resilient members are attached at one of their ends to the under surface 18 of rigid platform 12 and at their other ends to the upper surface 20 of base 16. The plurality of resilient members may be attached to the platform 12 and the base 16 by epoxy glue or other fastening means.

Figure 2:
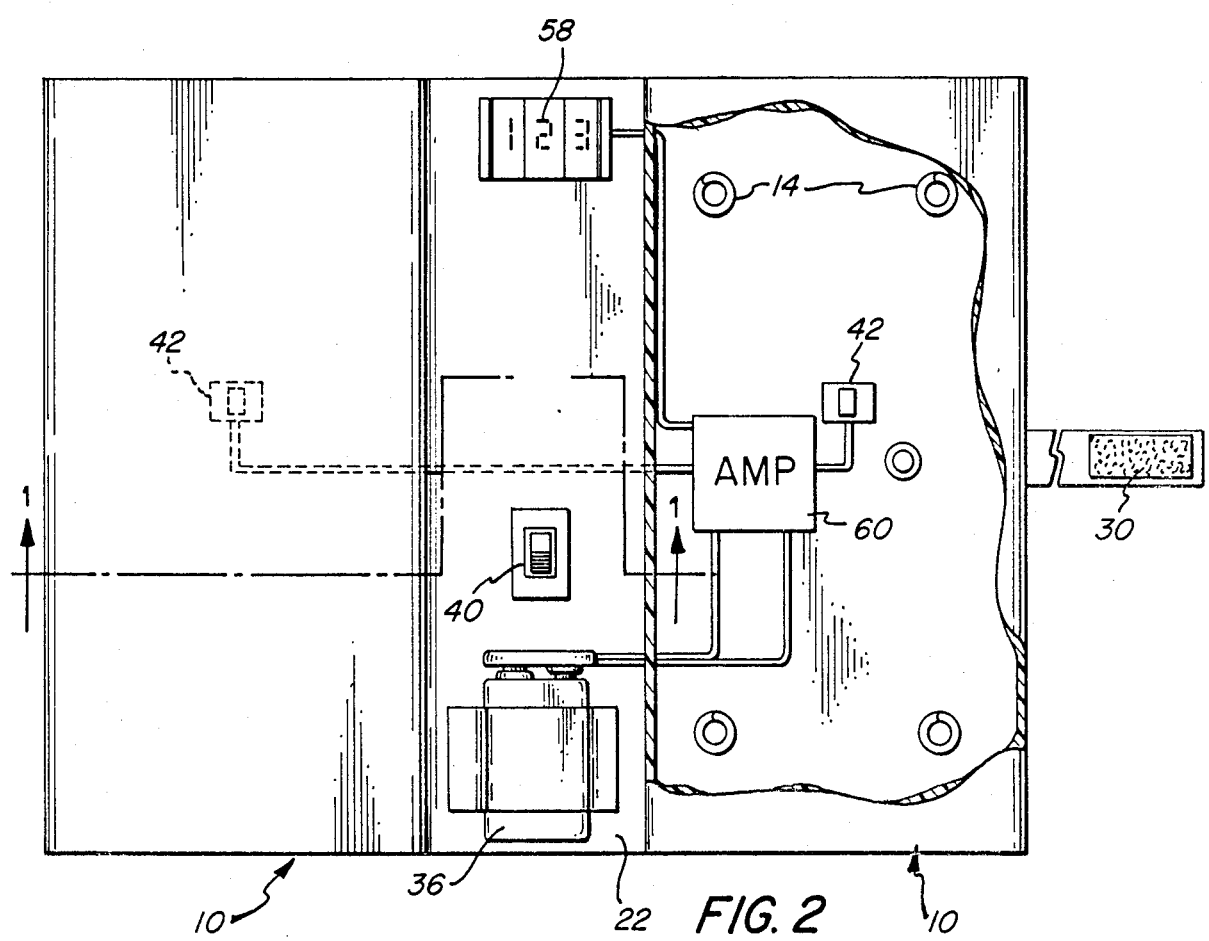
FIG. 2 is a plan view of an unfolded scale in its normal configuration for use in weighing an object with a cut-away of one of the weighing assemblies.

In the preferred embodiment there are four of the helical springs 14, shown in FIG. 2 as being distributed in a rectangular pattern. Each helical spring 14 comprises a ⅜ inch coil. However, any similar resilient member having a high load capacity and stiffness may be used. It is preferred that resilient members should be selected to provide a compression length which is linear in response to the force applied. Thus, in the preferred embodiment, springs having a compression distance which is linearly related to the force applied when the force is in the range of between zero and approximately 300 pounds is selected. However, it is not necessary to provide each spring with the capacity for linear response over the entire range of human weight because such weight will be supported in the preferred embodiment by four springs under each platform. The springs may thus be selected to provide a linear response over a range equal to a quarter of the total measuring range of the scale. A proper resilient support may thus be selected by one of ordinary skill according to the aforementioned factors.

Figure 4:
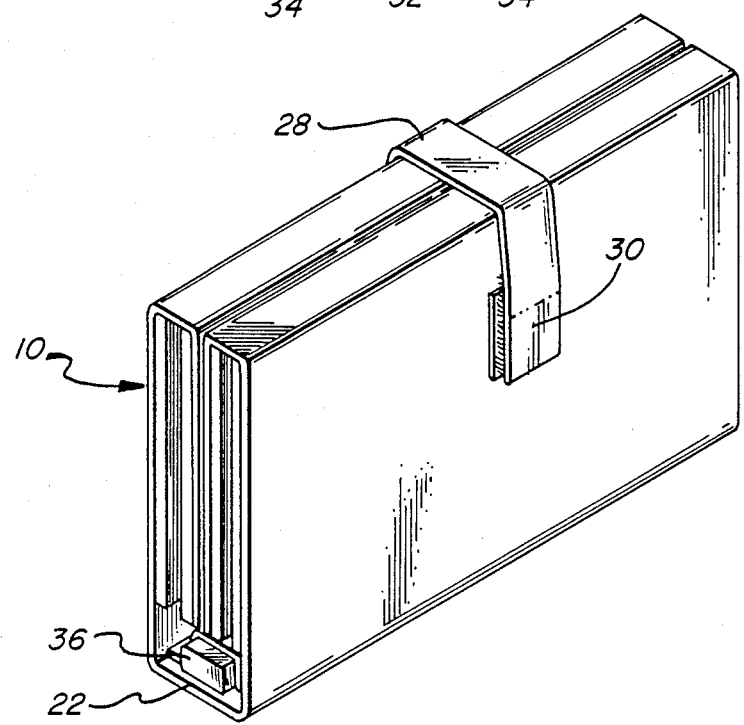
FIG. 4 is a perspective view of a folded up scale in accordance with the present invention.

One edge of base 16 is attached by a flexible joint 22 to one edge of a second base 16 of a second weighing assembly as shown in FIG. 2. The flexible joint 22 can comprise a fabric or a reinforced plastic or other bendable material. Flexible joint 22 should be at least twice as wide as the distance between upper surface 24 of platform 12 and under surface 26 of base 16 but optimally shall be even wider, to allow power supply source 36 and display 58 to be held out of the way of upper surfaces 24 of each weighing assembly 10 when they are placed against one another when the scale is folded up, as shown in FIG. 4. The folded scale is held in the folded position by a strap 28 and fastener 30. Fastener 30 may comprise any of such combinations as a snap, a buckle or any other fastening means which are well known in the art, including the fastener of the preferred embodiment which is a Velcro hook and loop fastener combination.

Figure 3:
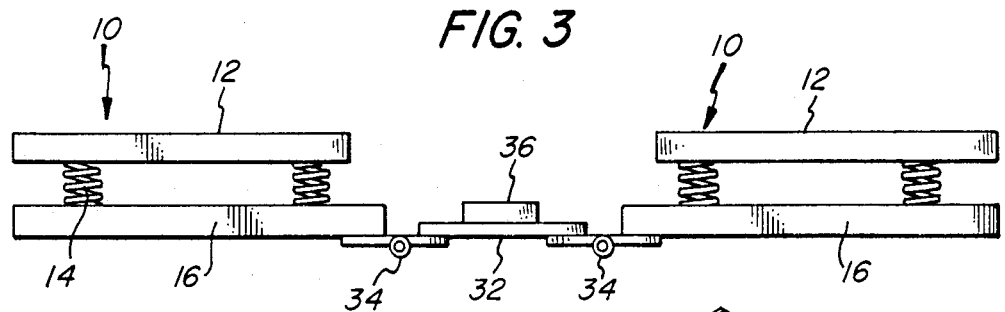
FIG. 3 is a side elevation view of an unfolded scale using an alternative embodiment of the flexible joint comprising a rigid strip connected to edges of the weighing platforms by a plurality of hinges.

In an alternative embodiment, shown in FIG. 3, a flexible joint is formed using a rigid strip 32 attached to the edges of adjacent bases 16 by means of hinges 34.

Figure 5:
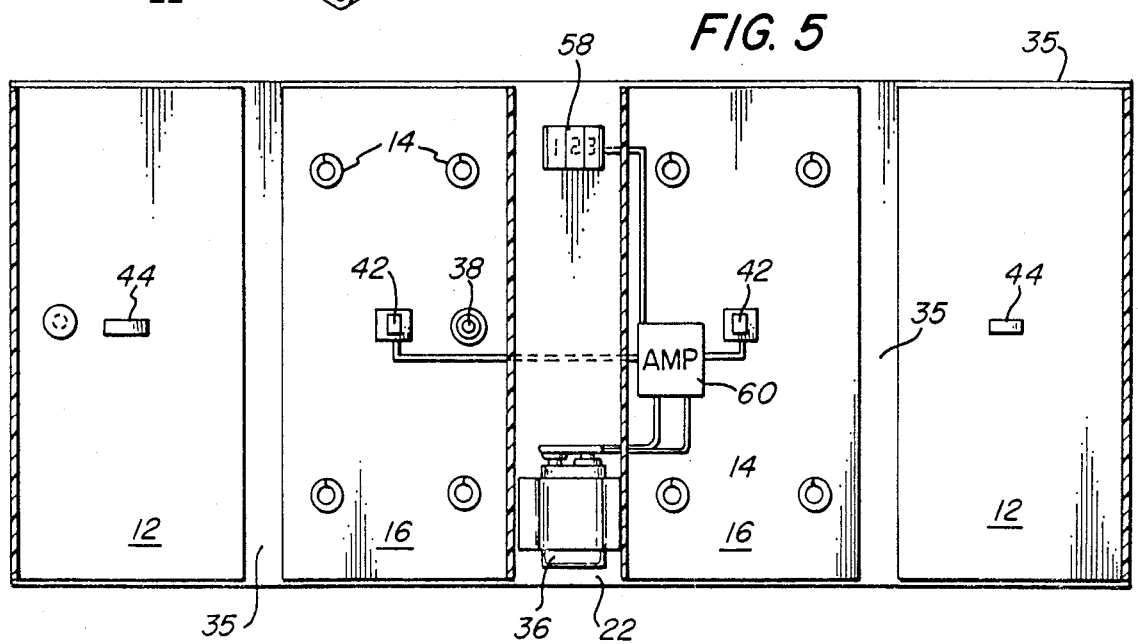
FIG. 5 is a plan view of a scale of the present invention completely unfolded with its weighing platforms disconnected from their bases.

The entire scale may be covered as shown in FIG. 1 with a fabric 35 to cover the gap between the platform 12 and the base 16 and to provide a more pleasing appearance for the product. The fabric may be a single piece sized as shown in FIG. 5 to wrap around all the components of the weighing assembly.

A power supply source 36, such as a 9 volt transistor battery is mounted on the upper surface of the flexible joint such that it will not block the movement of the platform 12 under the weight of the person being weighed. A power supply switch such as a micro switch 38 in FIG. 1 which is activated by the weight of a person stepping on the scale or, in an alternative embodiment, a slide switch 40 in FIG. 2, is provided.

Measurement of weight in the present invention is effected by sensitive instrumentation and circuitry which measures the movement of each rigid platform relative to its base under the weight of the object placed on each platform, and determines the weight on each platform, and then sums the weights and outputs the total weight to a display. In the preferred embodiment the degree of platform movement determines the relative motion of a magnet and a magnetic sensor which are mounted respectively on the platform under surface 18 and the base upper surface 20 of each weighing assembly 10. The magnetic sensor is preferably an integrated circuit Hall effect sensor such as those sold by the Sprague Electric Company of Concord, N.H. under the model numbers UGN-3503U and UGS-3503U. Hall effect sensors are capable of tracking and outputting a voltage responsive to small changes in magnetic flux density.

Magnetic sensor 42 is optimally mounted on base 16 instead of on the platform 12 to reduce the possibility of damage to the sensor leads, but in an alternative embodiment sensor 42 may be mounted on the platform 12 instead. At least one magnet 44 is mounted on the surface opposite the surface on which the sensor is mounted oriented in a slide-by arrangement with the sensor 42. The slide-by arrangement is used in the preferred embodiment because it is sensitive to small movements.

In the preferred embodiment, two magnets 44 and 46 are joined together side by side with opposite magnetic poles facing the sensor 42 to provide a larger and more easily measured change in magnetic flux density when the platform moves.

Figure 6:
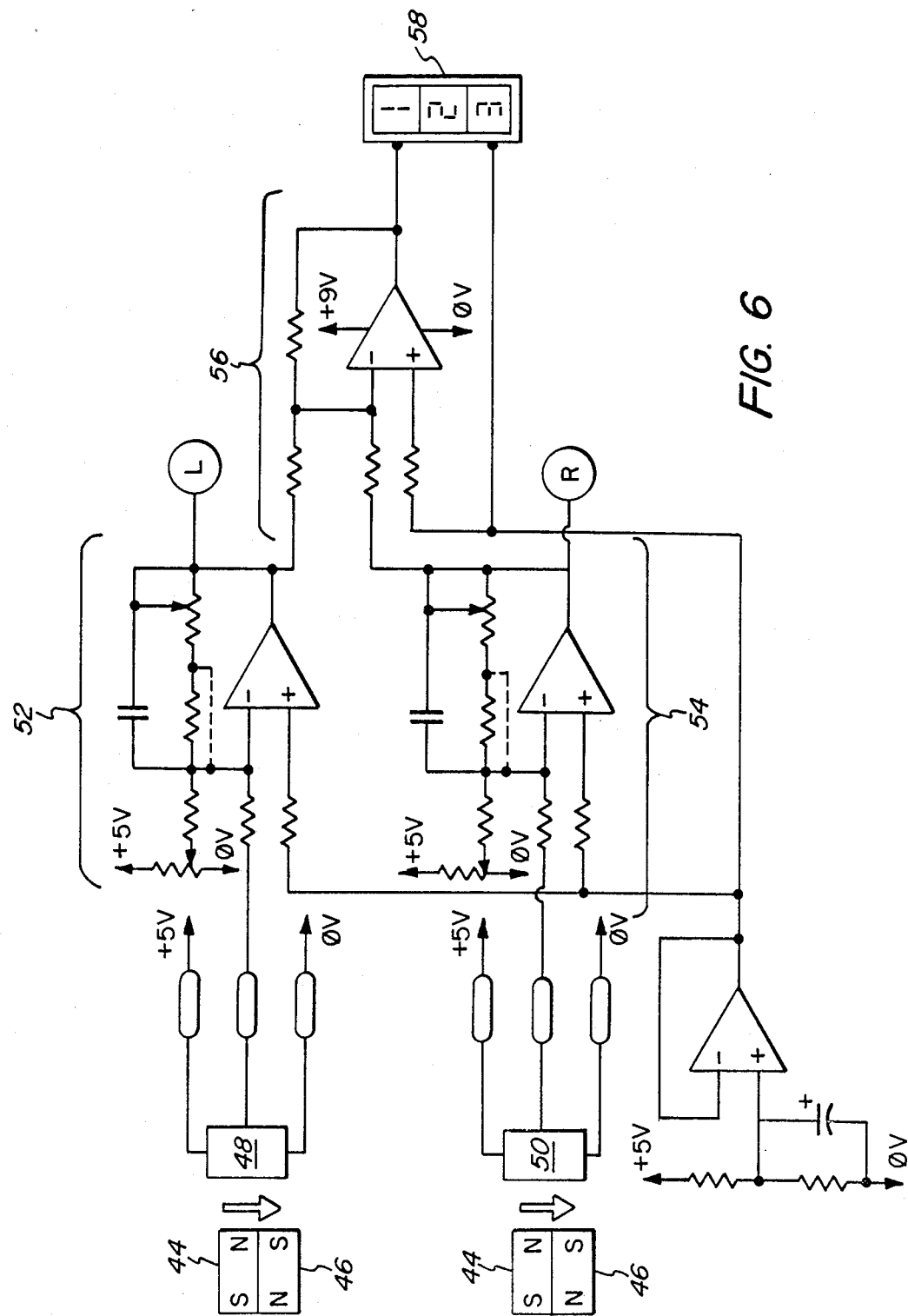
FIG. 6 is a schematic diagram of the sensing summing and amplifying circuitry of the present invention.

The voltage output from the sensors 42 responsive to the motion of magnets 44 and 46 in each weighing assembly 10 is amplified and summed using circuitry as shown in FIG. 6. The output from left Hall effect sensor 48 mounted inside a left weighing platform 10 is amplified by operational amplifier and associated feedback circuitry 52. Similarly, the output from right Hall effect sensor 50 is amplified by operational amplifier and associated feedback circuitry 54. The amplified output from the left and right circuits is then summed by operational amplifier and associated resistive feedback circuitry 56. The specific selection of resistance and capacitive values used in the circuitry will depend on the compression characteristics and number of the resilient members, the arrangement of and distance between the magnets and sensor, the strength of the magnetic field of the magnets used, and the electrical characteristics of the Hall effect sensors. Such selection of circuit values may be made by one skilled in the art in accordance with the mentioned variables.

The output voltage representing total weight of the object on the scale from the summing circuitry 56 is then fed to a display 58 which displays the weight of the object on the scale.

Display 58 is preferably a digital display using either a liquid crystal or a light emitting diode display. Such displays are lightweight and require only a small power supply. Analog to digital circuitry should be provided to convert the output voltage from summing circuitry 56 to a form appropriate for digital display.

The display 58 is mounted on flexible joint 22 where it can be seen when the scale is unfolded. The amplifying and summing circuitry may be mounted on a board 60 located inside one of the weighing assemblies 10 or in any other convenient location.

Therefore, the present invention provides a lightweight and portable folding scale which is adapted for use by a person and which provides a consistent and accurate measure of weight.

What is claimed is:

1. A scale for weighing a object, said scale comprising:
    at least two means for generating electrical signals representative of a weight of said object, said at least two generating means each comprising a Hall effect integrated circuit sensor and at least one magnet, said at least two generating means for supporting said object to be weighed and generating said electrical signals in response to the displacement of said generating means under the weight of said object, and each said at least two generating means for providing an electrical signal representative of the partial weight supported by each said generating means;
    means operatively connected to said at least two generating means for electrically summing said electrical signals from said at least two generating means;
    means operatively connected to said summing means for electrically displaying an indication of the weight;
    means for flexibly joining said at least two generating means whereby said joining means may be folded to form a compact case from said at least two generating means.

2. A scale in accordance with claim 1 wherein there are two of said magnets for each said Hall effect integrated circuit sensor, said two magnets being joined together side by side with opposite poles facing said Hall effect integrated circuit sensor, said two magnets being oriented to slide by said Hall effect integrated circuit sensor.

3. A scale for weighing an object comprising:
    a pair of weighing assemblies, each having a rigid platform and a base, said platform for receiving the weight of said object and moving relative to said base, said platform being held in a spaced relationship from said base by a plurality of resilient support members;
    means comprising a flexible joint for joining one edge of one weighing assembly to one edge of the other weighing assembly, and for permitting the two weighing assemblies to be folded against one another to form a compact case;

at least one magnet associated with each of said weighing assemblies moveable in relation to means for sensing and providing an information output in response to variations in magnetic flux, according to the degree of platform movement;

means operatively connected to said sensing means for summing said information output;

means operatively connected to said summing means for displaying an indication of weight.

4. A scale in accordance with claim 3 wherein said at least one magnet are mounted on said platform means and said sensing means are mounted on said base.

5. A scale in accordance with claim 3 wherein said at least one magnet are mounted on said base and said sensing means are mounted on said platform means.

6. A scale in accordance with claim 3 wherein said magnets are joined together side by side with opposite poles facing said sensing means and are arranged to slide by said sensing means.

7. A scale in accordance with claim 3 wherein said sensing means are Hall Effect integrated circuit sensors.

8. A folding scale in accordance with claim 7 wherein said Hall effect integrated circuit sensors are capable of a linear voltage output in response to magnetic flux density changes, and said Hall effect sensors are operatively connected to operational amplifier circuits for amplification and said operational amplifier circuits for amplification are operatively connected to said summing means, said summing means comprising an operational amplifier having a resistive feedback circuit for summing the output from said operational amplifier circuits, and the output from said operational amplifier for summing being operatively connected to an analog to digital conversion circuit, and said conversion circuit is operatively connected to said display means; and said display means comprises a digital display.

9. A scale in accordance with claim 3 wherein said flexible joint is attached to one edge of each of said bases and has a width substantially equal to or greater than twice the distance between the under surface of one of said bases to the upper surface of one of said rigid platforms.

10. A scale in accordance with claim 3 wherein said flexible joint comprises a fabric.

11. A scale in accordance with claim 3 wherein said flexible joint comprises a plastic material.

12. A scale in accordance with claim 3, wherein said flexible joint comprises a rigid strip attached to one edge of each of said bases by a plurality of hinges.

13. A scale in accordance with claim 3, wherein said weighing platforms and said bases are covered with a fabric.

14. A folding scale comprising:

a pair of rigid weighing platforms for receiving the feet of the person to be weighed on their upper surface, connected on their under surface to the upper surface of a pair of bases by a plurality of resilient helical springs, said bases being connected to each other along an edge of each said bases by a flexible joint;

a pair of magnets mounted on the under surface of each of said weighing platforms and disposed in spaced relation to means for sensing magnetic flux density and providing a voltage output in linear relation to magnetic flux density mounted on the upper surface of each of said bases, said magnets being disposed to slide by said sensing means when said weighing platforms move relative to the bases under the weight of said person on said weighing platforms;

means responsive to said sensing means for summing the voltage output of each of said sensing means;

and means responsive to said summing means for displaying an indication of the weight on said weighing platforms.

15. A folding scale in accordance with claim 14 further comprising a switched power source means for energizing said sensing means, said summary means and said display means.

16. A folding scale in accordance with claim 14 wherein said pair of magnets have opposite poles facing said sensing means.

17. In an electronic scale having a weighing assembly which comprises a platform means for receiving and moving relative to a base under the weight of the object to be weighed and which is held in a spaced relationship by a plurality of resilient support members from said base, and magnets moveable inside said weighing assembly, according to the degree of platform movement, relative to sensor means for sensing and providing a voltage output in response to variations in magnetic flux density, and circuit means for scaling and converting said voltage output into a form suitable for operating a digital display means for displaying weight, the improvement comprising:

means for flexibly joining two of said weighing assemblies such that they may be folded against each other to form a compact case; and means operatively connected to two of said sensor means for summing the voltage output from said two sensor means, one in each of said weighing assemblies, said summing means being operably connected to said circuit means for scaling and converting said voltage output from said summing means.

* * * * *